United States Patent
Kroon et al.

(10) Patent No.: US 10,890,782 B2
(45) Date of Patent: Jan. 12, 2021

(54) MULTI-VIEW DISPLAY DEVICE

(71) Applicant: KONINKLIJKE PHILIPS N.V., Eindhoven (NL)

(72) Inventors: Bart Kroon, Eindhoven (NL); Olexandr Valentynovych Vdovin, Eindhoven (NL); Eibert Gerjan Van Putten, Eindhoven (NL); Mark Thomas Johnson, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 223 days.

(21) Appl. No.: 14/895,072

(22) PCT Filed: May 21, 2014

(86) PCT No.: PCT/EP2014/060469
§ 371 (c)(1),
(2) Date: Dec. 1, 2015

(87) PCT Pub. No.: WO2014/195136
PCT Pub. Date: Dec. 11, 2014

(65) Prior Publication Data
US 2016/0124236 A1   May 5, 2016

(30) Foreign Application Priority Data
Jun. 3, 2013   (EP) .................................... 13170243

(51) Int. Cl.
*G02B 27/22*     (2018.01)
*G02B 30/27*     (2020.01)

(52) U.S. Cl.
CPC .................................. *G02B 30/27* (2020.01)

(58) Field of Classification Search
CPC ..... H04N 13/04; H04N 13/0404–0406; H04N 13/0409; H04N 13/0497; H04N 13/0239;
(Continued)

(56) References Cited

U.S. PATENT DOCUMENTS

| | | | | |
|---|---|---|---|---|
| 5,500,765 A | * | 3/1996 | Eichenlaub | G02B 27/2214 348/E13.028 |
| 6,061,179 A | * | 5/2000 | Inoguchi | G02B 27/2214 348/59 |

(Continued)

FOREIGN PATENT DOCUMENTS

| | | |
|---|---|---|
| EP | 1045596 A2 | 10/2000 |
| JP | 2001356299 A | 12/2001 |

(Continued)

OTHER PUBLICATIONS

De Boer, Dick K.G. et al "Switchable Lenticular based 2D/3D Displays", Stereoscopic Displays and Virtual Reality Systems XIV, Proceedings of SPIE, 2007.

(Continued)

*Primary Examiner* — Stephone B Allen
*Assistant Examiner* — Jyotsna V Dabbi

(57) ABSTRACT

A multi-view display includes a view forming arrangement having a first view forming structure spaced by a first distance from a display panel for providing multiple views across a first direction, and a second view forming arrangement spaced by a second distance from the display panel for providing multiple views across a second perpendicular direction. An angular width of the multiple views in the two directions can thus be independently defined.

20 Claims, 7 Drawing Sheets

(58) Field of Classification Search
CPC ........... H04N 13/0055; H04N 13/0296; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; H04N 13/0431; H04N 13/0415; H04N 9/3197; H04N 9/3105; G02B 27/22; G02B 27/2214; G02B 27/2228; G02B 27/2257; G02B 27/2235; G02B 27/225; G02B 27/2264; G02B 27/017; G02B 27/26; G03B 35/00–12; G03B 35/20; G03B 31/06; G03B 31/00; G02F 1/133512; G02F 1/29
USPC ...... 359/462–464, 466; 348/42–60; 353/7–9; 349/8–9, 15
See application file for complete search history.

(56) References Cited

U.S. PATENT DOCUMENTS

| | | | |
|---|---|---|---|
| 6,069,650 A | 5/2000 | Battersby | |
| 6,204,967 B1* | 3/2001 | Morishima | G02B 27/2214 348/54 |
| 6,859,240 B1* | 2/2005 | Brown | H04N 13/239 349/15 |
| 7,215,475 B2 | 5/2007 | Woodgate | |
| 8,149,342 B2* | 4/2012 | Ijzerman | G02B 27/2214 349/15 |
| 2003/0214497 A1 | 11/2003 | Morishima | |
| 2005/0099688 A1* | 5/2005 | Uehara | G02B 27/2214 359/462 |
| 2010/0259697 A1 | 10/2010 | Sakamoto | |
| 2011/0075256 A1 | 3/2011 | Dezwart et al. | |
| 2011/0169919 A1* | 7/2011 | Karaoguz | H04N 13/0029 348/46 |
| 2012/0057229 A1 | 3/2012 | Kikuchi | |
| 2013/0069938 A1 | 3/2013 | Kim | |
| 2014/0049706 A1* | 2/2014 | Park | G02B 27/22 349/15 |

FOREIGN PATENT DOCUMENTS

| | | |
|---|---|---|
| JP | 2005157332 A | 6/2005 |
| JP | 2006018282 A | 1/2006 |
| WO | 2007072289 A2 | 6/2007 |
| WO | 2007072330 A1 | 6/2007 |
| WO | 2008032248 A1 | 3/2008 |
| WO | 2009101558 A1 | 8/2009 |
| WO | 2010122690 A1 | 10/2010 |

OTHER PUBLICATIONS

Willemsen, O.H. et al "Fractional Viewing Systems to Reduce Banding in Lenticular Based 3D Displays", Proc. Int. Displ. Workshops, vol. 12, 2005, pp. 1789-1792.

* cited by examiner

MULTI-VIEW DISPLAY DEVICE

CROSS-REFERENCE TO PRIOR APPLICATIONS

This application is the U.S. National Phase application under 35 U.S.C. § 371 of International Application No. PCT/EP2014/060469, filed on May 21, 2014, which claims the benefit of U.S. Provisional Patent Application No. or European Patent Application No. 13170243.3, filed on Jun. 3, 2013. These applications are hereby incorporated by reference herein.

FIELD OF THE INVENTION

This invention relates to multi-view displays.

BACKGROUND OF THE INVENTION

A multi-view display is typically created by applying a special layer to a 2D display. Known options for this layer are a barrier for barrier displays, a lenticular lens sheet for lenticular displays or a microarray of lenses.

No matter which option is chosen, the effect is that depending on the viewpoint of an eye (or camera) a different image is projected, thus providing stereoscopic vision (stereopsis) without needing special glasses. This is what is meant by "auto" stereoscopic.

FIG. 1 shows the basic principle for a display using a lenticular lens array. The display comprises a conventional (2D) display panel 2 having an array of pixels 4 over which a view forming arrangement 6 is provided. This comprises lenticular lenses 8. If each lens overlies 4 pixels in the display width direction, then light from those four pixels will be projected in different directions, thereby defining different viewing areas, numbered V1 to V4 in FIG. 2. In each of these viewing areas, an image is projected which is formed as the combination of all pixels with the same relative position with respect to the lenses.

The same effect can be achieved with barriers, which limit the output direction with which light is emitted from each pixel. Thus, in each output direction, a different set of pixels can be viewed.

The increase in angular resolution (i.e. the multiple views) results in a diminishing of the spatial resolution (i.e. the resolution of each individual view). In the case of vertical lenticular sheets and barriers, this resolution reduction is entirely in the horizontal direction. By slanting the lenticular sheet the resolution reduction can be spread over both horizontal and vertical directions providing for a better picture quality.

FIGS. 2 and 3 show examples of 3D lenticular display constructions.

FIG. 2 shows the least complicated design, comprising a lenticular lens sheet 6 over the display panel, with a spacer 10 between. The curved faces of the lenticular lenses face outwardly, so that convex lenses are defined.

FIG. 3 shows a preferred design which has better performance under wide viewing angles. The curved lens surfaces face the display panel, and a replica layer 12 is used to define a planar internal surface. This replica can be a glue (typically a polymer) that has a refractive index that is different from that of the lenticular lens, so that the lens function is defined by the refractive index difference between the lens material and the replica material. A glass or polycarbonate slab is used as the spacer 10, and the thickness is designed to provide a suitable distance for the lenticular lens to focus on the display panel. Preferably the refractive index of the slab is similar to the refractive index of the glue.

It is well known that a 2D/multi-view switchable display can be desirable.

By making the lens of a multi-view display electrically switchable, it becomes possible for example to have a high 2D resolution mode (with no lens function) in combination with a 3D mode. Other uses of switchable lenses are to increase the number of views time-sequentially as disclosed in WO 2007/072330 or to allow multiple 3D modes WO 2007/072289.

The known method to produce a 2D/3D switchable display is to replace the lenticular lens by a lens-shaped cavity filled with liquid crystal material. The lens function can be turned on/off either by electrodes that control the orientation of LC molecules or else by changing the polarization of the light (for example using a switchable retarder).

The use of graded refractive index lenses has also been proposed, in which a box-shaped cavity is filled with liquid crystal and an electrode array controls the orientation of LC molecules to create a gradient-index lens (this is disclosed for example in WO 2007/072330). An electrowetting lens, which is formed of droplets of which the shape is controlled by an electric field has also been proposed for 2D/3D switching. Finally, the use of electrophoretic lenses has also been proposed, for example in WO 2008/032248.

As mentioned above, there is always a trade-off between spatial and angular resolution. Displays with lenticular lenses and vertical barriers offer horizontal parallax only, allowing for stereopsis and horizontal motion parallax and occlusion, but not vertical motion parallax and occlusion. As a result, the autostereoscopic function is matched to the orientation of the display. Only with full (horizontal and vertical) parallax can the 3D effect be made independent of the screen orientation.

However, at least in the medium term, display panels will not have sufficient resolution to enable full parallax at HD resolution, at least not with large numbers of views. There is therefore a problem for devices that are designed to operate in portrait and landscape mode, such as handheld devices.

This problem has been recognized, and some of the solutions above which provide 2D/3D switching capability have been extended to include multiple 3D modes, such as portrait and landscape modes. In this way, three modes are enabled: 2D, 3D portrait and 3D landscape.

Full parallax may be possible already for a system comprising just two views, thus resulting in only moderate resolution loss and therefore the switching between 3D modes can be avoided. If a non-switching approach is to be used, the minimal microlens array design that is dual view and dual orientation has 2×2 views and preserves the maximum amount of spatial resolution.

The common RGB stripe pixel layout comprises red, green and blue sub-pixel columns. Each sub-pixel has an aspect ratio of 1:3 so that each pixel triplet has a 1:1 aspect ratio. The lens system typical translates such rectangular 2D sub-pixels into rectangular 3D pixels.

When a micro lens is associated with such a display panel, for example with each microlens over a 2×2 sub-array of pixels, the lens design has the problem that the viewing cone in one of the two orthogonal directions is three times as wide as in the other.

FIG. 4 shows this effect, and shows each group of 4 sub-pixels with three pixels on and one off, and with a 10% defocus. This means the focal length of the lenses differs by 10% compared to the lens-display distance. This is to prevent sharp focusing of the black mask pattern between the pixels.

The peaks in the light intensity plots show the positions of the repeated views (i.e. within different viewing cones) of a given pixel. They show the light power per unit area (in Watts per mm$^2$) at different positions across the display screen. One plot is for the landscape mode and the other is for the portrait mode. Thus, the pitch of the repeating pattern corresponds to the viewing cone width. Clearly, in the direction across the long sub-pixel axis (the x-axis), the viewing cone width is much larger than in the direction across the short sub-pixel axis (the y-axis).

The bright areas represent illuminance distributions from each group of 3 pixels turned on, on a plane situated at the optimum observation distance from the display. The x- and y-axes represent linear displacements.

Small viewing cone angles have a tangent which may be approximated by the lenticular pitch divided by the thickness of the stack. For the RGB stripes layout, the lenticular pitch in one direction is three times as much as in the other as can be seen from FIG. 4, so the viewing cone will be three times as wide as well. As a consequence, at certain (fixed) viewing distance, in one direction (e.g. portrait) the user has to hold the device carefully to avoid getting out of the cone, while for the other direction it may be difficult to find the 3D zone because the views are so wide. There is therefore a need for a full parallax autostereoscopic display, which enables the viewing cone sizes in the two orthogonal display orientations to be independently defined.

US 2013/0069938 discloses a display unit which in one example has two orthogonal lenticular arrays.

SUMMARY OF THE INVENTION

The invention is defined by the claims.

According to the invention, there is provided a multi-view display, comprising: a display panel; and a view forming arrangement formed over the display panel for providing a multi-view function, wherein the view forming arrangement comprises a first view forming structure spaced by a first distance from the display panel for providing multiple views across a first direction, and a second view forming structure spaced by a second distance from the first view forming structure for providing multiple views across a second perpendicular direction, such that the angular width of the multiple views in the two directions is independently defined, wherein the angular widths of the multiple views in the two directions are in the ratio of smaller angular width to larger angular width of 1:n where n<2. This arrangement separates the provision of multiple views across the display between two view forming structures, each for different orthogonal directions. Together, they provide full parallax, so that the display can be viewed in portrait or landscape mode without requiring any switching function. Preferably, n<1.5, even more preferably n<1.2.

These angluar widths thus differ by less than 100% (i.e. the larger is no more than double the smaller), and more preferably even less, for example less than 50% (the larger is no more than 1.5 times the smaller) or even less than 20% (the larger is no more than 1.2 times the smaller). This makes the viewing cones of similar size. By "angular width of the multiple views" is meant the angle over which one full set of views is displayed along one of the viewing directions. It corresponds to the angle over which a set of pixels corresponding to the set of unique views in one of the viewing directions can be viewed through a single view forming element (i.e. lens or barrier opening). At a more remote viewing angle these pixels becomes visible through an adjacent view forming element.

Preferably, both view forming structures are operable at the same time so that no switching between modes is needed. The display light passes through both view forming structures. One provides parallax in one direction and the other provides parallax in the other direction. Thus, the display can be rotated between orientations without needing any switching of the display configuration. However, one or both of the view forming structures can be made electrically switchable, in known manner.

By providing the same angular width (which is often termed the cone width) in the two orthogonal directions the optical performance can be matched in the different orientations. In order to provide this matching, the spacing distances as well as the materials used in the stack (such as the spacer materials) can be selected. If materials of the same refractive index are used, the design simplifies with only the geometric distance needing to be taken into account. The size of the view forming elements (lenses or barriers—which together make up the view forming structures) is typically dictated by the underlying pixel configuration, since each individual view forming element is intended to overly a certain number of sub-pixels of the display, which then determines the number of views to be formed.

The display panel may comprise rectangular sub-pixels. Rectangular pixels give rise to the viewing cone variation in different orientations when microlenses are used. The aspect ratio of the sub-pixels can be 1:3, which is typically the case for RGB striped pixel configurations.

The first view forming structure preferably has a periodic structure, with a period based on the number of sub-pixel dimensions in a first direction across the sub-pixels (but the period is corrected to provide focusing to the desired viewing distance), and the second view forming structure has a periodic structure, with a period based on the number of sub-pixel dimensions in a second orthogonal direction across the sub-pixels (but again the period is corrected to provide focusing to the desired viewing distance).

If the period for each view forming structure is based on the number of sub-pixels numbers as mentioned above, it means that the same number of views is generated in the landscape and portrait modes, by providing the same number of sub-pixels per view forming element. When the underlying sub-pixels are rectangular, this results in different required pitch for the two view forming arrangements.

The periods for the two view forming structures can be based on different numbers of sub-pixels for portrait and landscape modes. This will result in different resolution loss in the two orientations but can still correct for different viewing cone sizes.

The first view forming structure closest to the display panel can be made of material with a first refractive index n, and the second view forming structure can be made of material with a smaller refractive index. This arrangement enables the thickness of the optical stack to be kept to a minimum.

In a preferred example, $$\frac{p_1}{(t_1/n_1)} = k \cdot \frac{p_2}{(t_1/n_1) + (t_2/n_2)}$$

in which $p_1$ is the period of the first view forming structure, $t_1$ is the height of the first view forming structure over the display panel and $n_1$ is the refractive index of the material between the display panel and the first view forming structure, $p_2$ is the period of the second view forming structure, $t_2$ is the height of the second view forming structure over the first view forming structure, and $n_2$ is the refractive index of the material between the first and second view forming structures, wherein k is between 0.5 and 2, more preferably between 0.75 and 1.5, more preferably between 0.9 and 1.1.

This means the ratio of the period of the one view forming structure to an effective optical distance (distance divided by refractive index) of the one view forming structure from the display panel and the ratio of the period of the other view forming structure to an effective optical distance (distance divided by refractive index) of the other view forming structure from the display panel are made to be similar. This results in the viewing cones being substantially the same. The ratios can of course be equal (k=1).

This equation simplifies to geometric distances only if the refractive index values are the same.

In one set of examples, the view forming arrangement comprises a first spacer layer over the display panel, a first lens layer (e.g. lenticular lens array) over the first spacer layer, a second spacer layer over the first lens layer and a second lens layer (e.g. lenticular lens array) over the second spacer layer.

The spacer sizes and materials enable control over the viewing cone angles. The first and second lens layers can define convex lens interface shapes, with respect to the direction of light through the view forming arrangement from the display panel. In this case, the first spacer layer, the first lens layer and the second lens layer can be glass or plastic, and the second spacer layer is air.

In another example, the first lens layer defines convex lens interface shapes, and the second lens layer defines concave lens interface shapes, with respect to the direction of light through the view forming arrangement from the display panel. In this case, the first spacer layer, the first lens layer and the second lens layer can be glass or plastic with a first refractive index, and the second spacer layer is glass or plastic with a second, lower refractive index.

In an alternative set of examples, the view forming arrangement can comprise a first spacer layer over the display panel, a first barrier layer over the first spacer layer, a second spacer layer over the first barrier layer and a second barrier layer over the second spacer layer. The invention can thus be applied to barrier type displays as well as to lenticular lens type displays.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a multi-view display in which a view forming arrangement comprises a first view forming structure spaced by a first distance from the display panel for providing multiple views across a first direction, and a second view forming structure spaced by a second distance from the display panel for providing multiple views across a second perpendicular direction. The angular width of the multiple views in the two directions can thus be independently defined.

A regular microlens display does not allow independent design of the viewing cone in first and second directions. In fact, the viewing cone ratio equals the sub-pixel aspect ratio multiplied by the ratio of number of views along the two directions:

$$\frac{a_p}{a_l} \frac{N_p}{N_l}$$

where $a_p$ and $a_l$ are the sub-pixel dimensions along the two directions (for instance portrait and landscape).

A regular microlens is suitable when $$\frac{a_p}{a_l} \frac{N_p}{N_l}$$

is close to the desirable viewing cone ratio.

The invention provides a display that performs like a micro lens display, but does allow independent design of the viewing cones.

Figure 5:
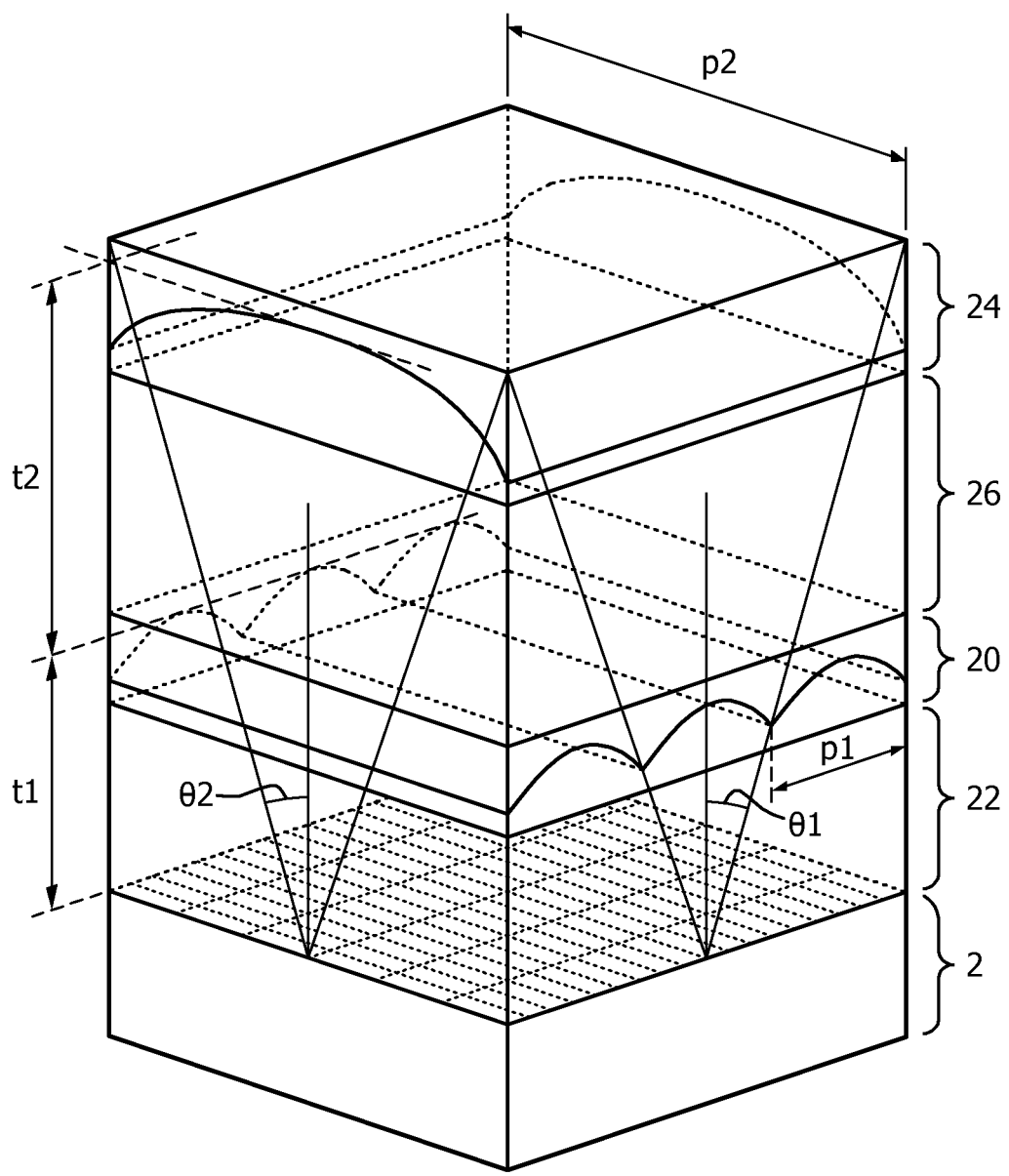
FIG. 5 shows a first example of view forming arrangement of the invention.

FIG. 5 shows a first example of view forming arrangement of the invention in the form of a lens stack.

The lens arrangement comprises a first lens arrangement 20 spaced from the surface of the display panel 2 by a bottom spacer 22. The first lens arrangement and spacer have a combined thickness of t1 so that the lens surfaces are a distance t1 from the display panel 2. A second lens arrangement 24 is spaced from the first lens arrangement 20 by a second spacer 26. The second lens arrangement and the second spacer have a combined thickness of t2 so that the lens surfaces are a distance t2 from the first lens arrangement and at a distance of t1+t2 from the display panel 2. The two lens arrangements are designed with sufficient focus on the pixels in the display panel module.

For thin lenses, the thickness of the lens array can be ignored. The viewing cone half-angle $\theta 1$ in the material of the spacer in the first direction as implemented by the first lens array 22 is given by $\tan \theta 1 = p1/2 \, t1$, as can be seen from FIG. 5.

As an approximation, if the viewing cone angle is small, the full viewing cone angle in the material $\alpha 1 = 2\theta 1$ can be approximated by $\tan \alpha 1 = p1/t1$.

For the example of the two spacers having the same refractive index, the viewing cone half-angle in the material of the spacer in second direction as implemented by the second lens arrangement is given by $\tan \theta 2 = p2/2(t1+t2)$, or as an approximation for the full viewing cone $\tan \alpha 2 = p2/(t1+t2)$.

If, for example, viewing cones should be designed to be similar, then:

$$\frac{p_1}{t_1} \approx \frac{p_2}{t_1 + t_2}$$

In the case the two spacers are made of materials with different refractive indices and in the approximation of thin lenses, the above condition of having similar viewing cones in two directions of observation in air can be written as $$\frac{p_1}{(t_1/n_1)} \approx \frac{p_2}{(t_1/n_1) + (t_2/n_2)}$$

where $n_1$ and $n_2$ are refractive indices of the material of the first and the second spacer respectively.

This equation takes account of the refractive index values in the stack. If the refractive index $n_1=n_2$, then the second equation simplifies to the first, and only the geometric distance needs to be taken into account. The refractive index of the lenses also need to be taken into account for a complete optical analysis, although typically the spacers are thicker than the lenses so that the spacers dominate.

The reason why a value t/n is required when taking account of the refractive index values is that the cone angles are calculated in the medium, but the effective 3D cone angles which the user perceives are in air.

According to Snell's law $n \times \sin(\alpha_n) = \sin(\alpha_{air})$

Using the approximation for small angles:

$n \times p/t = p/t_{effective}$ so that $t_{effective} = t/n$.

For example, in the case of an RGB striped display, where the pixel components have a height to width ratio of 3:1, for the design with the same number of views in two observation directions (for instance 2×2 view design) the pitches of the lens-stack relate as 3 $p_1=p_2$, so 2 $t_1 \approx t_2$ This means the spacer that is sandwiched by the lenses is optically thicker than the spacer between the display panel and the first lens 20.

The lens design of the invention can use non-switchable lenses, so that full parallax is provided permanently. The same viewing cone performance is obtained for either display orientation.

There is some freedom in implementing the invention.

Figure 1:
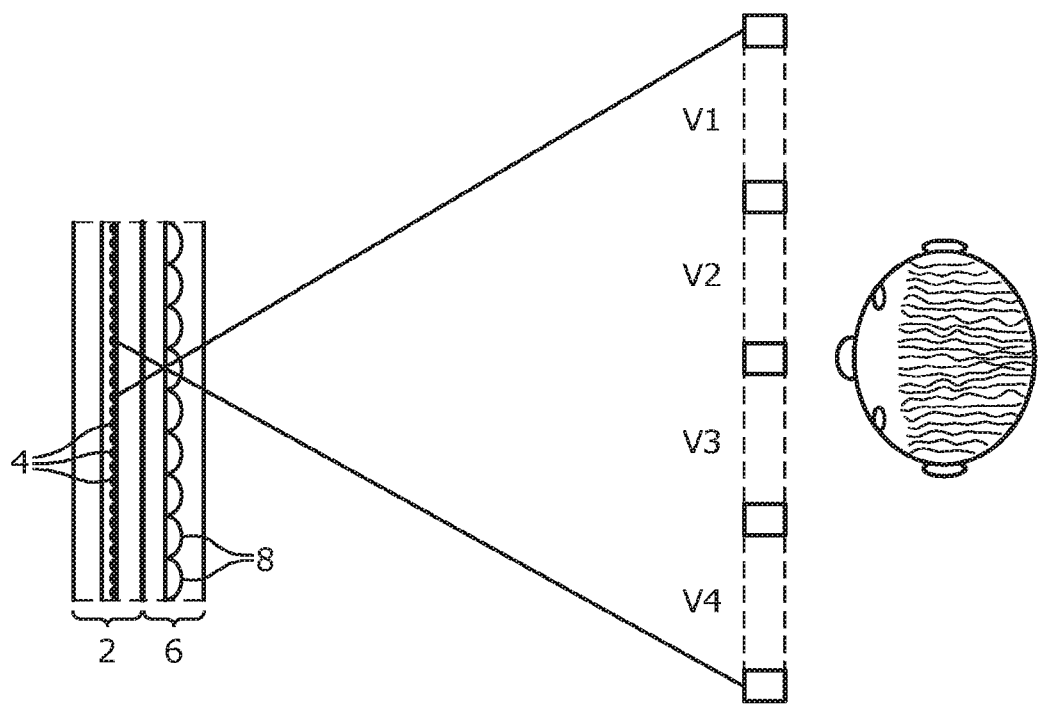
FIG. 1 shows a known multi-view display to explain the basic principle of operation.
Figure 2:
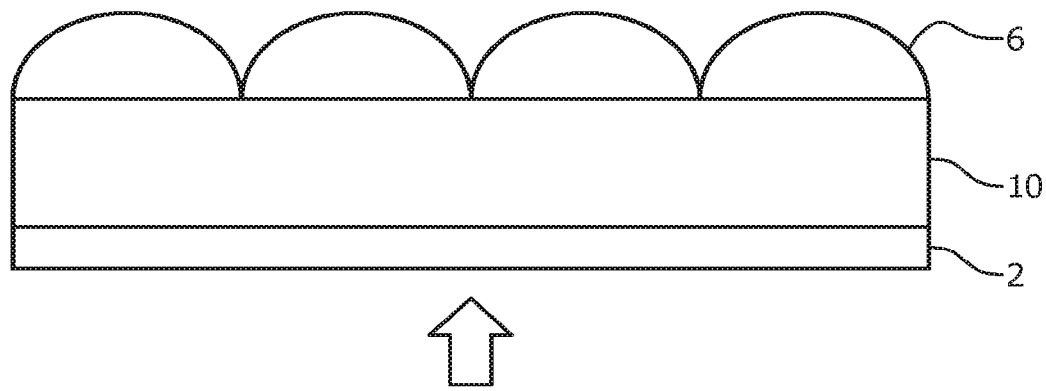
FIG. 2 shows a first example of known lens design.
Figure 3:
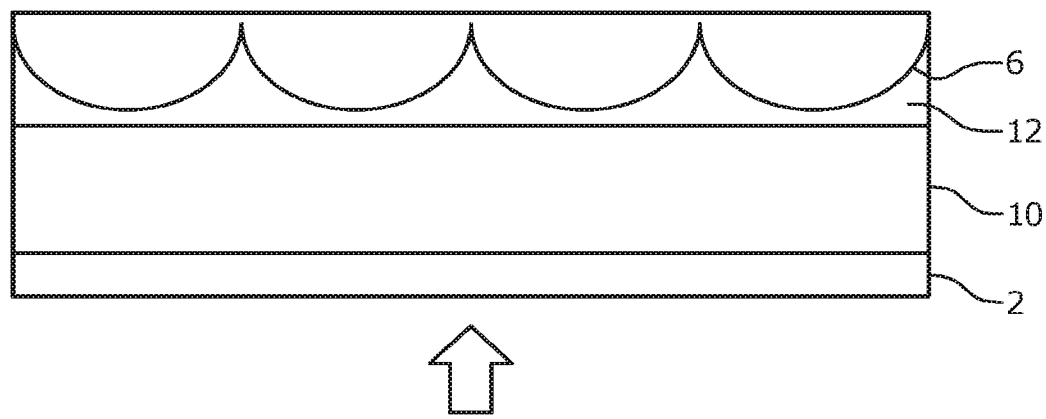
FIG. 3 shows a second example of known lens design.

The lens curvatures can be positive or negative, for example as explained with reference to FIGS. 2 and 3.

In some configurations, a spacer can be integrated with a lens by making the planar side of the lens thicker.

Either one or both of the lenses could be made as a switchable lens, for instance using one of the techniques that are described above. This could be used to enable the lens function to be switched off completely for a 2D mode, or it could be used to enable parallax in one direction only but with a higher resolution in another direction.

In a system with thick lenses and various refractive indexes, the above relations are only rough approximations. In practice, a balance will be found through numerical simulation and by choosing materials, lens shapes and spacer thicknesses in conjunction. These parameters are typically optimized such that the viewing cone is similar in both directions (e.g. portrait and landscape).

It may be desired to decrease the total thickness of the structure to reduce weight and size for a portable device. For this reason, in a preferred embodiment it will be advantageous to realize the lower spacer with a higher refractive index, whilst the top spacer should have a lower refractive index, for example air. In this manner, the total stack thickness is reduced whilst maintaining the optical ratio (e.g. 3:1) to maintain cone sizes. A further consequence of such an approach is that the lens interfaces will preferably have opposite curvatures.

Two example solutions will now be presented.

1. Air Gap Solution

This solution can have the structure as shown in FIG. 5. Spacer 22 is glass/plastic, for example with refractive index 1.5.

Lens 20 is glass/plastic and plano-convex as shown in FIG. 5.

Spacer 26 is an air gap with mechanical supports to provide the desired fixed distance.

Lens 24 is glass/plastic and also plano-convex (as shown in FIG. 5).

Figure 4:
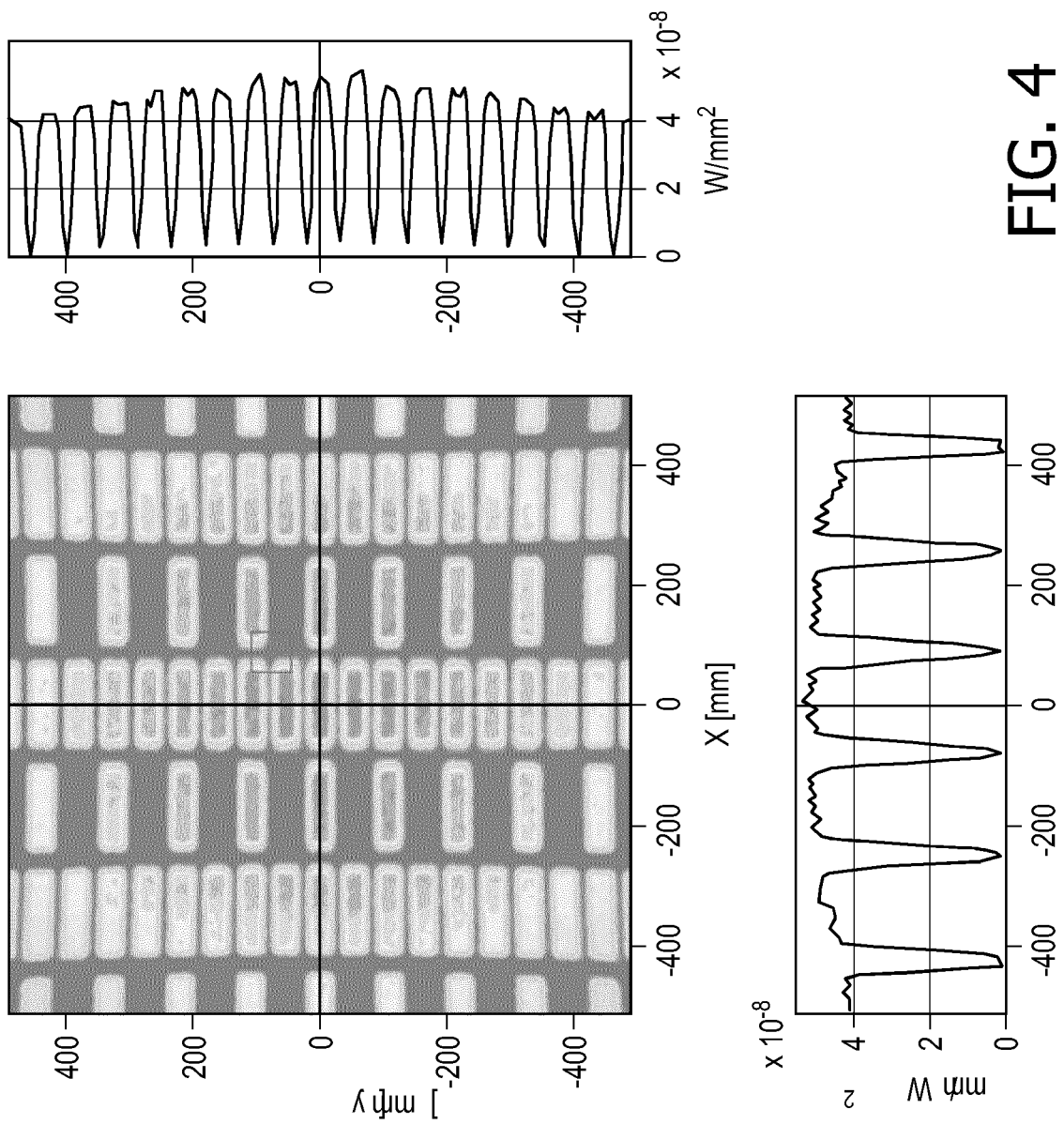
FIG. 4 is used to explain the problem of different viewing cone sizes for different display orientations.
Figure 6:
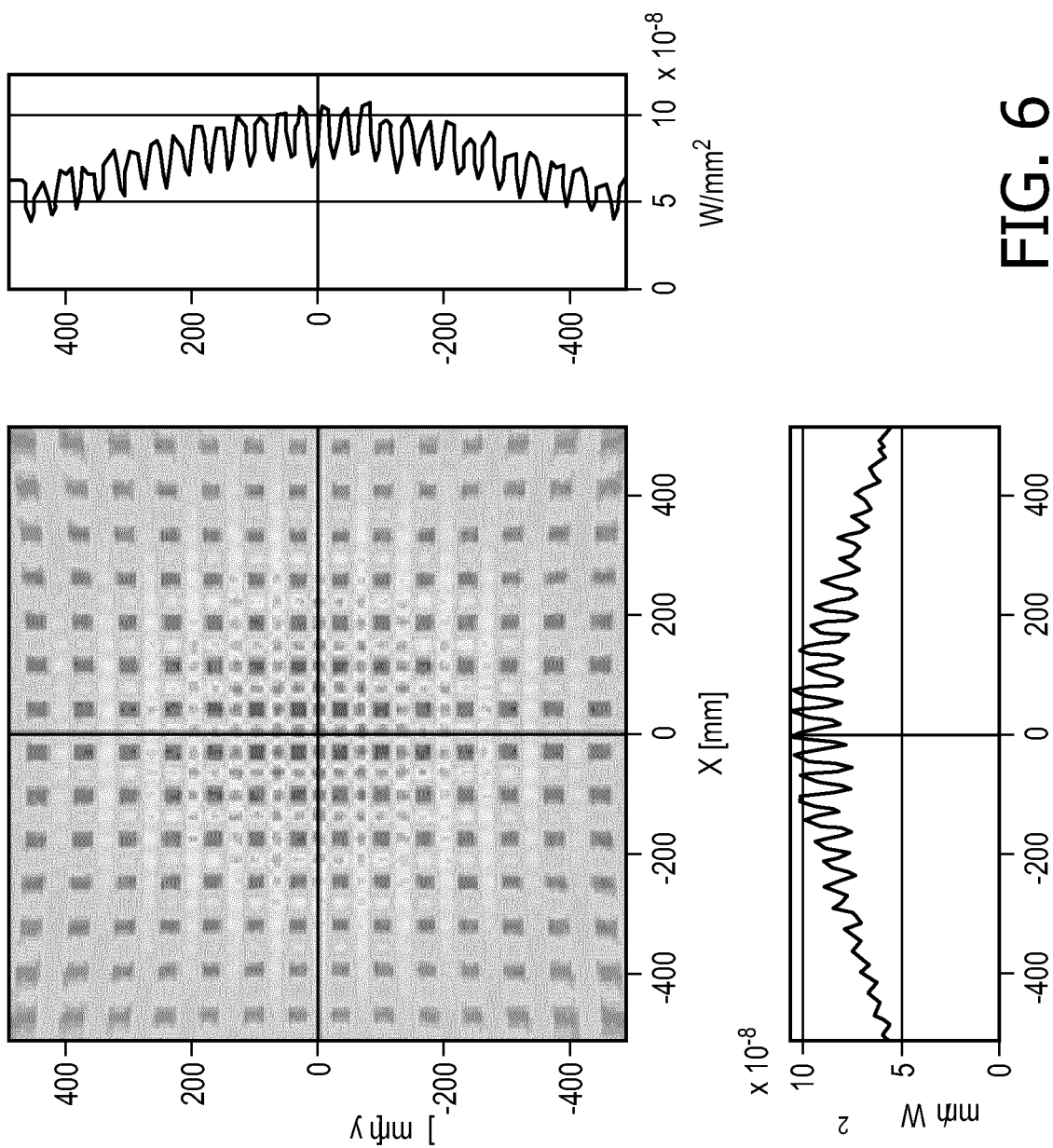
FIG. 6 shows how the problem of different viewing cone sizes for different display orientations is resolved by the design of FIG. 5.

FIG. 6 shows a simulation of the performance of the structure of FIG. 5, showing the illuminance on a detector plane placed at the optimal viewing distance from the display, with three views out of four turned on. FIG. 6 shows that non-equal viewing cone distributions for the regular microlens (FIG. 4) changes to equal viewing cones. FIG. 6 is similar to FIG. 4 and again shows the light power per unit area (in Watts per $mm^2$) at different positions across the display screen. One plot is for the landscape mode and the other is for the portrait mode.

2. Low Refractive Index Difference Solution

Figure 7:
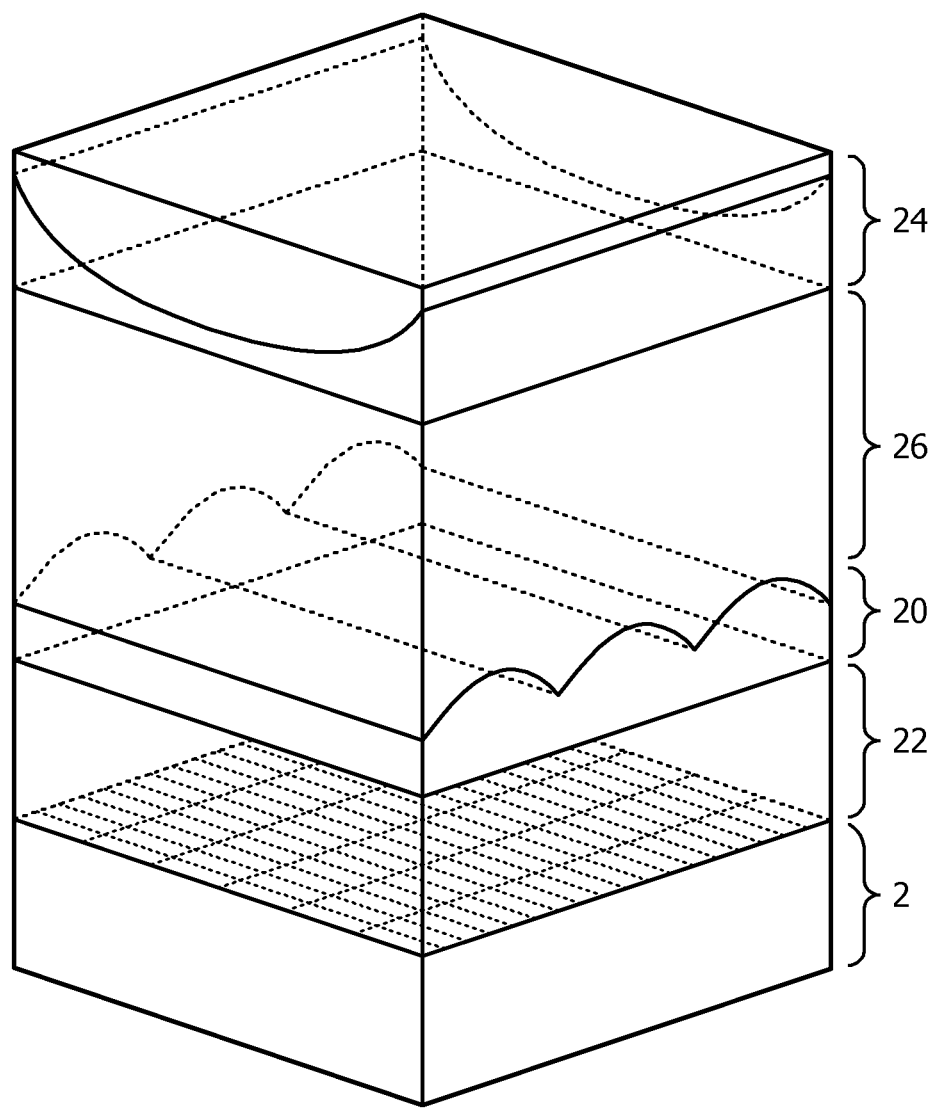
FIG. 7 shows a second example of view forming arrangement of the invention.

This solution can have the structure shown in FIG. 7. In this context, a low refractive index is in the range 1.3-1.5 (typically 1.4), a high refractive index is in the range 1.45-1.75 (typically 1.6), and a low refractive index difference is in the range 0.1-0.3 (typically 0.2).

Spacer 22 is glass/plastic with high refractive index. Lens 20 is integrated with spacer 22 and is the same glass/plastic with the same high refractive index and is plano-convex.

The spacer 26 has a low refractive index. The lens/spacer unit 20,22 is laminated to the second spacer 26 with low index-matching glue.

The second lens 24 also has a high refractive index and is plano-convex, and is laminated to the spacer 26 with low index-matching glue. However, the second lens is inverted compared to the first lens, so that it defines a concave lens shape with respect to the direction of display light through the lens stack. The first lens 20 is thus arranged as shown in FIG. 2 and the second lens 24 is arranged as shown in FIG. 3.

There can be more than two refractive index values in the system, but each interface gives reflections that add to the 3D crosstalk. Unnecessary interfaces should thus be avoided.

Figure 8:
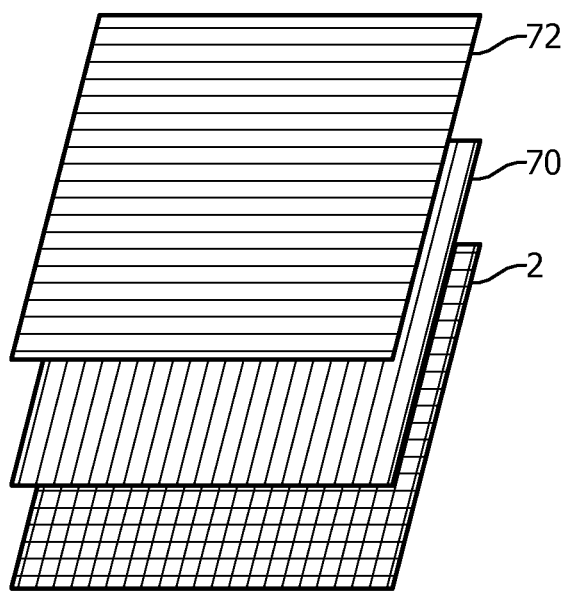
FIG. 8 shows a third example of view forming arrangement of the invention based on barriers instead of lenses.

The two examples above are based on the use of lenticular lenses. FIG. 8 shows in schematic form an alternative approach in which the same design methodology is applied to a barrier type display. A first barrier layer 70 is over a first spacer layer (not shown) which is over the display panel 2, and the second barrier layer 72 is over the second spacer layer (not shown).

The spacing sizes are selected using the methodology above, with the barrier opening widths and pitch dependent on the underlying pixel structure, in the same way as for the lenticular designs.

The display panel typically has a sub-pixel grid with elongated sub-pixels, for example as in the RGB stripe display. Elongated sub-pixels are also used in other pixel configurations and the invention can be applied more generally.

The invention can be applied to phones, tablets and cameras with autostereoscopic displays.

The two view forming layers may have orthogonal lenticulars or barriers, but even for the portrait/landscape function, they may not be orthogonal. For example they may be vertical in one mode but slanted to the vertical in the other mode. A typical slant is arctan(⅙)=9.46 degrees. Thus, the lenticulars may be orthogonal or at 80.54 degrees for this example of slant. Other slant angles are of course possible.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A multi-view display of an image, comprising:
   a display panel for emitting light to provide the image; and
   a view forming arrangement formed over the display panel for providing a multi-view function, the light emitted from the display panel passing through the view forming arrangement,
   wherein the view forming arrangement comprises a first view forming structure separated from the display panel by a first distance for providing multiple views of the image across a first direction, and a second view forming structure separated from the first view forming structure by a second distance for providing multiple views of the image across a second perpendicular direction, the first view forming structure being closer to the display panel than the second view forming structure, the second distance being greater than the first distance, and
   wherein angular widths of the multiple views of the image in the first direction and the second perpendicular direction are independently defined with an angular width defined by the first view forming structure in the first direction being smaller than an angular width defined by the second view forming structure in the second perpendicular direction in a ratio of 1:n, where n<2.

2. The display as claimed in claim 1, wherein n<1.5.

3. The display as claimed in claim 1, wherein both the first and second view forming structures are operable at the same time.

4. The display as claimed in claim 1, wherein the display panel comprises rectangular sub-pixels.

5. The display as claimed in claim 4, wherein both the first and second view forming structures have a periodic structure, and wherein the first view forming structure has a smaller period than the second view forming structure.

6. The display as claimed in claim 4, wherein $$\frac{p_1}{(t_1/n_1)} = k \cdot \frac{p_2}{(t_1/n_1)+(t_2/n_2)}$$

in which $p_1$ is a period of the first view forming structure, $t_1$ is the first distance of the first view forming structure from the display panel and $n_1$ is a refractive index of a material between the display panel and the first view forming structure, $p_2$ is a period of the second view forming structure, $t_2$ is the second distance of the second view forming structure from the first view forming structure, and $n_2$ is a refractive index of a material between the first and second view forming structures, wherein k is between 0.5 and 2, and wherein the refractive index $n_1$ is different from the refractive index $n_2$.

7. The display as claimed in claim 6, wherein k=1.

8. The display as claim in claim 6, wherein k is between 0.75 and 1.5.

9. The display as claim in claim 6, wherein k is between 0.9 and 1.1.

10. The display as claimed in claim 1, wherein the first view forming structure closest to the display panel is made of material with a first refractive index, and the second view forming structure is made of material with a lower refractive index.

11. The display as claimed in claim 1, wherein the first view forming structure comprises a first lenticular lens array and the second view forming structure comprises a second lenticular lens array, and
    wherein the view forming arrangement comprises a first spacer layer over the display panel, the first lenticular lens array over the first spacer layer, a second spacer layer over the first lenticular lens array and the second lenticular lens array over the second spacer layer.

12. The display as claimed in claim 11, wherein the first and second lenticular lens arrays define convex lens interfaces.

13. The display as claimed in claim 12, wherein the first spacer layer, the first lenticular lens array and the second lenticular lens array are glass or plastic, and the second spacer layer is air.

14. The display as claimed in claim 1, wherein the first view forming structure comprises a first lenticular lens array and the second view forming structure comprises a second lenticular lens array, and
    wherein the first lenticular lens array defines convex lens interfaces, and the second lenticular lens array defines concave lens interfaces.

15. The display as claimed in claim 14, wherein the view forming arrangement comprises a first spacer layer over the display panel, the first lenticular lens array over the first spacer layer, a second spacer layer over the first lenticular lens array and the second lenticular lens array over the second spacer layer, and
    wherein the first spacer layer, the first lenticular lens array and the second lenticular lens array are glass or plastic with a first refractive index, and the second spacer layer is glass or plastic with a second, lower refractive index.

16. The display as claimed in claim 1, wherein the first view forming structure comprises a first barrier layer and the second view forming structure comprises a second barrier layer, and
    wherein the view forming arrangement comprises a first spacer layer over the display panel, the first barrier layer over the first spacer layer, a second spacer layer over the first barrier layer and the second barrier layer over the second spacer layer.

17. A hand held device comprising the display as claimed in claim 1.

18. The display as claimed in claim 1, wherein n<1.2.

19. The display as claimed in claim 1, wherein the display panel comprises an array of pixels for emitting the light to provide the image.

20. A multi-view display of an image, comprising:
a display panel comprising a plurality of pixels providing the image; and
a view forming arrangement formed on the display panel, such that light from the image provided by the plurality of pixels passes through the view forming arrangement,
wherein the view forming arrangement comprises a first view forming structure spaced by a first distance from the display panel for providing multiple views of the image across a first direction, and a second view forming structure positioned further from the display panel and spaced by a second distance from the first view forming structure for providing multiple views of the image across a second direction perpendicular to the first direction, the second distance being greater than the first distance, and
wherein angular widths of the multiple views of the image respectively defined by the first view forming structure and the second view forming structure in the first direction and the second direction are in a ratio of smaller angular width to larger angular width of 1:n where n<2.

* * * * *